United States Patent [19]

De Boer

[11] 4,261,090

[45] Apr. 14, 1981

[54] TIRE CROSS CHAIN APPLYING AND REMOVING APPARATUS

[76] Inventor: Bradley A. De Boer, P.O. Box 1386, Winnemucca, Nev. 89445

[21] Appl. No.: 83,757

[22] Filed: Oct. 11, 1979

[51] Int. Cl.[3] .............................................. B23P 19/04

[52] U.S. Cl. ........................................ 29/252; 81/301; 7/125

[58] Field of Search ...................... 29/252, 268; 7/125; 81/3 R, 5.1 R, 301

[56] References Cited

U.S. PATENT DOCUMENTS 2,487,281 11/1949 Steckelberg .......................... 81/301

2,566,413 9/1951 Hartman ................................ 81/3 R 3,699,595 10/1972 Tofflemire .............................. 7/125

*Primary Examiner*—Robert C. Watson

*Attorney, Agent, or Firm*—Quaintance, Murphy & Richardson

[57] ABSTRACT

A pneumatic motor operates two pairs of fixed and movable jaws to open the hooks on tire cross chains for removal from the side chains and to close the hooks on new cross chains for applying to the side chains. An air hose connects to a vehicle air pressure system and is connected to an air line passing through a handle of the apparatus; a manual valve adjacent the handle controls the air supply to the motor.

2 Claims, 3 Drawing Figures

TIRE CROSS CHAIN APPLYING AND REMOVING APPARATUS

NATURE OF INVENTION

With this apparatus, cross chain links may be replaced easily and quickly under even the most severe conditions encountered on the road. A pneumatic tool, supplied with compressed air from a vehicle air pressure system, operates jaws to spread the hooks of the cross chains for removal from the side chains and to compress the hooks on the new cross chains to secure them to the side chains. In this manner, new cross chains may be applied on the road without difficulty, regardless of weather and location.

The invention resides in pairs of double jaws actuated by a pneumatic tool, one pair of jaws being formed to fit within a hook of a cross chain to open the hook, the other pair of jaws forming clamping jaws to close a hook on the new cross chain. These jaws are mounted on a support which carries a pneumatic motor for actuating the jaws. This motor is supplied with air under pressure through a handle of the support with a valve arranged adjacent the handle. A connection to a vehicle air pressure system enables the apparatus to be operated on the road.

DRAWINGS

DETAILED DESCRIPTION OF APPARATUS

Figure 1:
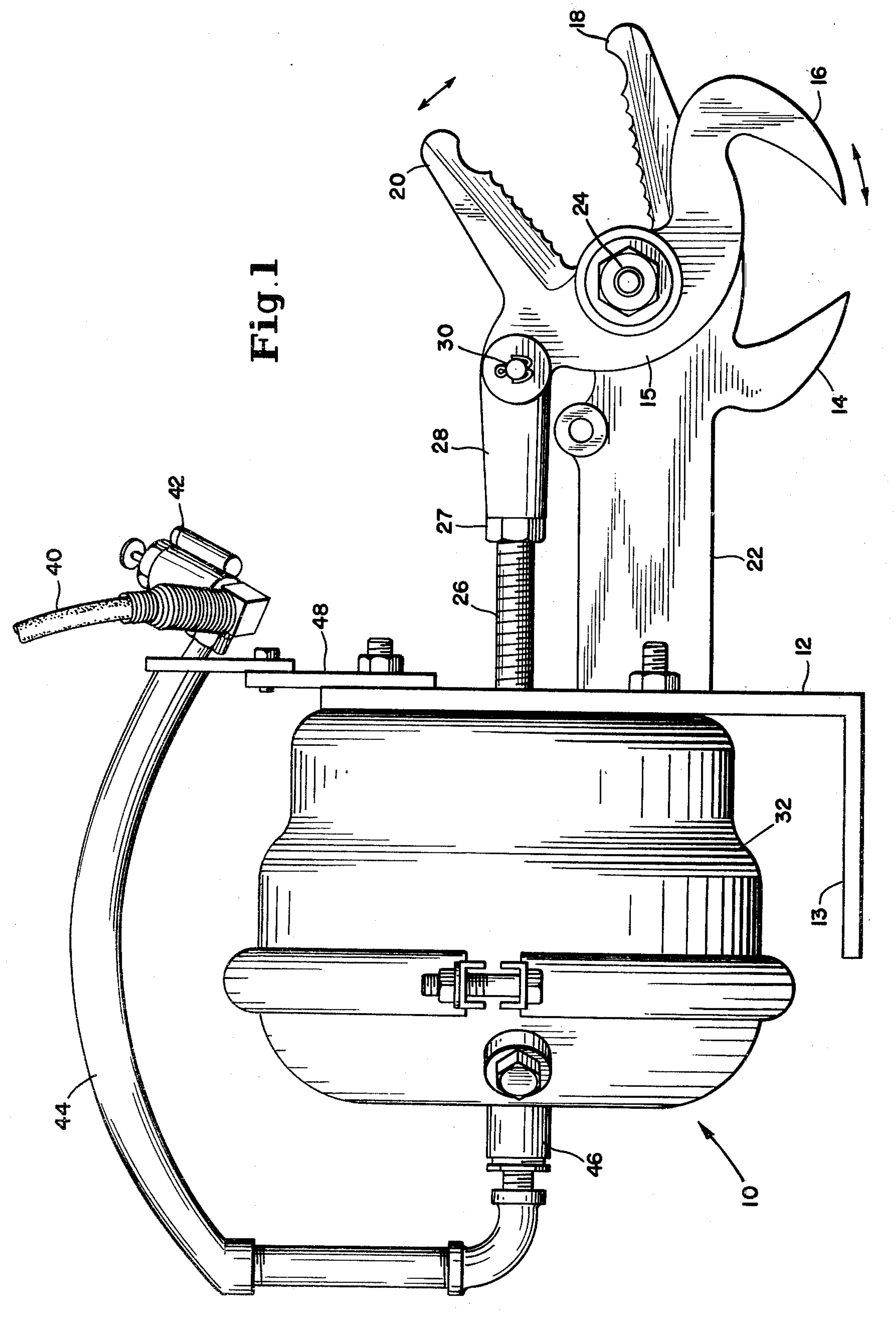
FIG. 1 shows a side elevation of the apparatus.
Figure 2:
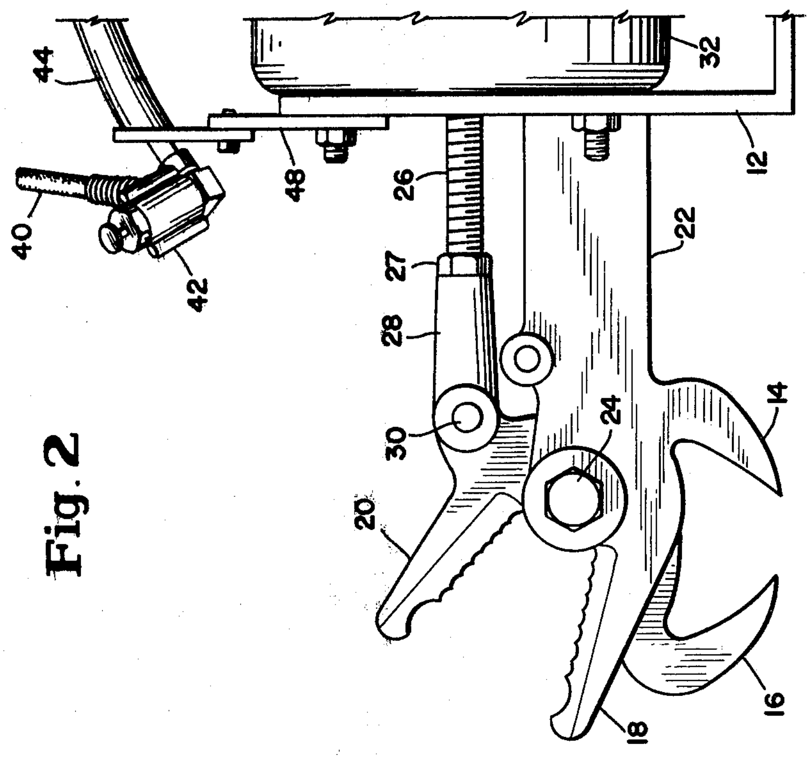
FIG. 2 shows a fragmentary side elevation of the opposite side of the jaw construction of the apparatus of FIG. 1.

The cross chain applying and removing tool 10 is mounted on a stand 12 which supports two pairs of relatively movable jaws, one pair 14, 16 for opening the hooks for removal of the cross chains and the other pair 18, 20 for closing the hooks in applying a new cross chain. A shank 22 fixed to the stand 12 carries a fixed jaw 14 of the opening jaws and a fixed jaw 18 of the closing jaws. A movable member 15 carries movable jaws 16, 20 formed integrally and pivoted on the shank 22 at 24, an operating rod 26 being pivotally connected to the movable jaw member 15 through sleeve 28 at 30. The threaded rod 26 and nut 27 allow adjustment of the rod 26 and sleeve 28.

A pneumatic diaphragm motor 32 carried by the stand 12 operates rod 26 to open and close both pairs of movable jaws. An air hose 40 supplies air under pressure through a manually operated valve 42 to an air line extending through the handle 44 connected to the pneumatic motor at 46. The forward end of handle 44 is connected to the stand 12 through a plate 48, which also carries the valve 42.

Operation of valve 42 admits air to the pneumatic motor 32 to actuate the rod 26 and close the jaws 14 and 16 and jaws 18 and 20. The stand 12 has a base 13 for supporting the tool.

Figure 3:
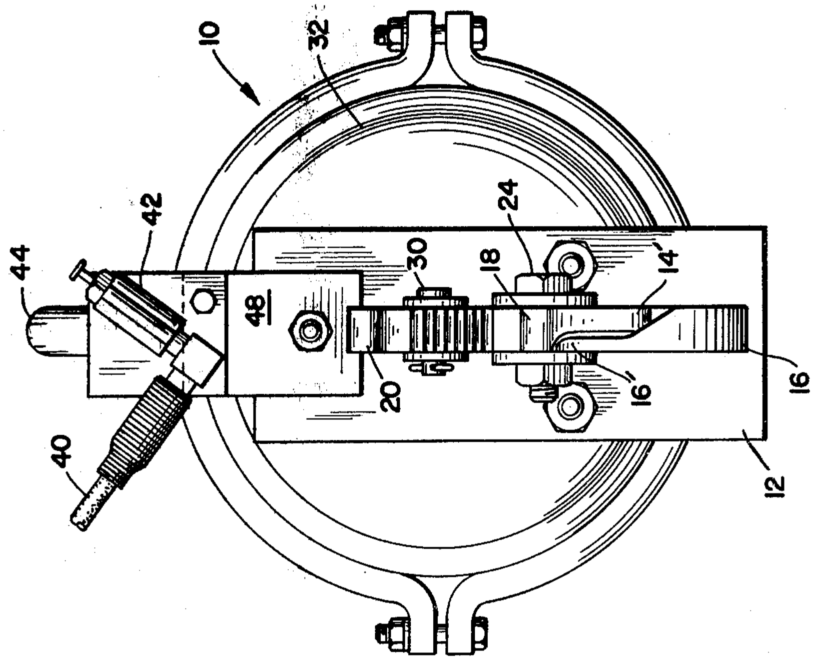
FIG. 3 shows an end elevation of the apparatus.

To remove a cross chain, the opening jaws 14, 16 engage in the hooks of the cross chain to open the hooks, the jaws 14, 16 being pointed with their ends overlapping as shown at 14', 16' in FIG. 3. The old chain is then removed and the open hooks of the new links are engaged in the side chains. Then the jaws 18, 20 are closed by actuating rod 26, thereby closing the hooks to connect the cross chains to the side chains.

I claim:

1. A pneumatic tool for applying and removing cross chains of tire chains comprising a stand supporting a pneumatic motor, a shank fixed on said stand having fixed integral jaw members, a movable member pivoted on said shank having a pair of jaw members integral therewith, and a reciprocable rod pivotally connected to said movable member and actuated by said pneumatic motor, each of said jaw members on said shank being opposed to one of said jaw members on said movable member, so that actuation of said reciprocable rod closes the two pairs of opposed jaw members, one of said pair of jaw members being pointed to engage in and open the hooks of a cross chain for removing the cross chain, the other pair of jaw members having clamping surfaces to close the hooks on a new cross chain for applying the cross chain.

2. A pneumatic tool as claimed in claim 1, in which a handle is attached to said stand at the forward end of said motor and extends to the opposite end of said motor, said handle having an air line therethrough to supply said pneumatic motor, a manual valve adjacent the forward end of said handle for actuation when holding said handle, and an air line connected to said valve and to the air line in said andle.

* * * * *